United States Patent Office
3,562,228
Patented Feb. 9, 1971

3,562,228
COPOLYMERIZATION OF OLEFINS
Demetreos N. Matthews, Pequannock, and Frederick C. Loveless, Oakland, N.J., and Robert J. Kelly, Columbia, S.C., assignors to Uniroyal, Inc., New York, N.Y., a corporation of New Jersey
No Drawing. Filed Mar. 25, 1968, Ser. No. 715,569
Int. Cl. C08f 15/40
U.S. Cl. 260—80.78
10 Claims

ABSTRACT OF THE DISCLOSURE

EPM or EPDM is made in improved yield in inert hydrocarbon solvent medium with a four-component catalyst system:

(a) vanadium oxytrichloride
(b) alkylaluminum sesquichloride
(c) 2-nitropropane or beta-methylanthraquinone, and
(d) an acid-scavenger which is an organic Lewis base containing a hetero atom (N, O, S, Se or Te), e.g. di-n-butylamine, ethyl acetate, acetone, etc.

component (c) serves as an activator for spent or dying catalyst and component (d), the acid acceptor, increases or prolongs the effectiveness of the activator.

BACKGROUND OF THE INVENTION

(1) Field of the invention

This invention relates to a catalyst for the copolymerization of olefins, and to a copolymerization method using such catalyst.

(2) Description of the prior art

Copolymerization of olefins with a soluble catalyst comprising (a) vanadium oxytrichloride and (b) alkylaluminum sesquichloride is known, as is the activation of such catalyst with (c) an oxidant (see Uniroyal Belgian Pats. 652,313 and 652,314, Aug. 26, 1964). Unfortunately, the activator (oxidant) tends to lose its effectiveness after a period of time. The invention seeks to ameliorate this difficulty.

U.S. Pat. 3,203,940 to Long, Aug. 31, 1965, discloses copolymerization of olefins in carbon tetrachloride as an oxidative medium, using catalysts based on vanadium compounds and alkylaluminum halides. Electron donors are used to increase the copolymerization rate and the yield. The present invention is directed to the problem of improving catalyst efficiency in an inert organic solvent medium which takes no part in the catalyst-forming and polymerization reactions.

SUMMARY OF THE INVENTION

The improved catalyst of the invention comprises
(a) Vanadium oxytrichloride,
(b) An alkylaluminum sesquichloride in amount such as to provide an Al:V mole ratio of from 5:1 to 20:1,
(c) 2 - nitropropane or beta-methylanthraquinone in amount of at least 0.1 mole per mole of vanadium, and
(d) An acid-scavenger selected from those organic compounds containing at least one of the hetero atoms N, O, S, Se and Te which are Lewis bases, in amount of at least 0.5 mole per mole of (c), the molar amounts of (c) plus (d) not exceeding the moles of Al in the amount of (b) taken.

It has been found that this catalyst provides greatly improved catalyst efficiency (unit weight of polymer produced per unit weight of vanadium compound) in the copolymerization of alpha-olefins in an inert hydrocarbon solvent to make a random, amorphous, rubbery copolymer either in the presence or absence of a copolymerizable non-conjugated diene. When a non-conjugated diene is present, the catalyst results in random introduction of the diene to yield an unsaturated terpolymer which is sulfur-vulcanizable to provide a high-quality, industrially acceptable vulcanizate, suitable for use in manufacturing rubber articles of all sorts. The improvement in catalyst efficiency is especially notable when the scavenger (d) is added, along with 2-nitropropane or beta-methylanthraquinone (c), to a polymerization reaction system containing spent or dying catalyst, since regeneration of the catalyst by (c) tends to generate acid residues which would tend to poison the catalyst in the absence of the concurrent addition of scavenger.

DESCRIPTION OF THE PREFERRED EMBODIMENTS

The catalyst system of the invention is, accordingly, highly useful for the preparation of amorphous, rubbery copolymers, substantially devoid of crystallinity, of at least two different alpha-monoolefins (usually ethylene and propylene, although other alpha-olefins [e.g., butene-1, pentene-1, etc.] may be used), with or without at least one copolymerizable polyene. Ordinarily the polyene is a non-conjugated diene such as dicyclopentadiene, 1,4-hexadiene, methylenenorbornene, ethylidenenorbornene, cyclooctadiene, or the like (cf. U.S. Pats. 2,933,480 of Gresham et al.; 3,211,709, Adamek et al.; 3,147,230, Gladding; 3,093,621, Gladding) or mixtures of dienes such as a mixture of dicyclopentadiene and ethylidenenorbornene. The invention is particularly directed to the preparation of "EPDM" rubbers (unsaturated, sulfur-vulcanizable ethylene-propylene-non-conjugated-diene terpolymers), although "EPM" (saturated rubbery ethylene-propylene binary copolymer) may also be prepared by the method of the invention.

It is to be emphasized that the catalyst system of the invention is of the soluble kind (i.e., soluble in the monomers and/or in the inert hydrocarbon used as polymerization medium, e.g., hexane, cyclohexane, benzene, etc.), as distinguished from insoluble or heterogeneous catalysts. The solubility of the presently employed catalyst is a consequence of the particular ingredients employed, and their proportions. The molar ratio of aluminum to vanadium is at least 5:1, and preferably at least 10:1; higher ratios such as 20:1 and over (e.g., 50:1) may also be used. The alkylaluminum sesquichloride is usually ethylaluminum sesquichloride, although other alkylaluminum sesquichlorides may be used, including those in which the alkyl group has from 1 to 8 carbon atoms (preferably 1 to 4 carbon atoms). The sesquichloride can be provided in any conventional manner—for example, by reacting dialkylaluminum monochloride ($R_2AlCl$) with monoalkylaluminum dichloride ($RAlCl_2$) in equimolar proportions so as to produce the sesquichloride ($R_3Al_2Cl_3$), or at least reacting them in such proportions as to produce a substantial content of sesquichloride.

The presently employed soluble catalyst behaves quite differently from an insoluble catalyst. Thus, the present catalyst is not an effective anionic coordination catalyst for the polymerization of propylene itself (only a very low yield being obtained, and that by a cationic mechanism) or of higher alpha-olefins (although it will interpolymerize propylene with ethylene). On the other hand, insoluble or heterogeneous catalysts (even those based on alkylaluminum halide and vanadium compounds) will homopolymerize propylene or higher olefins but are not well adapted for interpolymerization of ethylene with propylene to from amorphous, rubbery copolymer free from crystallinity. Such heterogeneous catalysts suffer from the further disadvantage of being incapable of introducing a nonconjugated diolefinic component randomly into the interpolymer, unlike the present soluble catalyst. Random distribution of the diene is necessary for good vulcanization characteristics.

The third essential component of the catalyst system of the invention, namely, component (c), 2-nitropropane or beta-methylanthraquinone, serves to activate or reactivate the catalyst and increase its efficiency (as well as in many cases to regulate the molecular weight of the polymer). For purposes of the invention it is important that the amount of 2-nitropropane or beta-methylanthraquinone (c) plus (d) not exceed the amount of alkylaluminum sesquichloride (b). Within this limitation, the amount of oxidant (c) employed may vary, depending on the other details of the process, from about 0.1 mole (preferably at least about 0.5 mole) of oxidant per mole of vanadium oxytrichloride, up to, say, about 10 moles of 2-nitropropane or beta-methylanthraquinone per mole of vanadium. Larger amounts may be used, provided, as indicated, that the molar amount of oxidant plus (d) does not exceed the molar amount of Al in the amount of alkylaluminum sesquichloride taken.

The present invention is based upon the discovery that a fourth component (d) as defined herein most surprisingly further increases the efficiency of the combination of (a), (b) and (c), to a most remarkable extent. This fourth essential component of the catalyst system of the invention, namely, component (d), the acid scavenger, is, as indicated previously, selected from those organic compounds containing at least one of the hetero atoms, N, O, S, Se, or Te which are Lewis bases. It has surprisingly been found that the inclusion in the catalyst composition of such an acid-scavenger leads to greater yields of polymer than would be obtained in the absence of such acid scavenger. While it is not desired to limit the invention to any particular theory of operation, it is believed that the present novel scavenger component may complex with acid residues which, in the absence of scavenger, might tend to make the catalyst ineffective. It is possible that the present acid-scavengers (Lewis bases) neutralize Lewis acids (HCl, $AlCl_3$, etc.) which may be formed in the conventional catalyst system [from interaction of ingredients (a), (b), and (c)].

Suitable organic acid-scavengers containing at least one of the hetero atoms oxygen, sulfur, nitrogen, selenium, or tellurium include such Lewis bases as simple amines, ketones, ethers, esters, ureas, thioureas, tetrazoles, sulfones, sulfoxides, sulfides, oxides, hydrazines, etc.

For purposes of the invention, the concentration of activator/oxidant (c), that is, 2-nitropropane or beta-methylanthraquinone, plus scavenger (d) shall not exceed the concentration of Al supplied by (b), on a molar basis. Within the limitation, the amount of acid-scavenger (d) employed may vary considerably. Surprisingly small amounts, e.g., 0.5 mole of acid-scavenger per mole of 2-nitropropane or beta-methylanthraquinone (c), are sufficient to produce noticeable improvement but it is usually preferred to use from 1 to 4 moles of acid-scavenger per mole of activator/oxidant (c). The most effective concentration of acid-scavenger will vary with the particular acid-scavenger, the type and concentration of oxidant, the solvent and the temperature of the reaction. Particularly preferred is a molar concentration of acid-scavenger three times the concentration of 2-nitropropane or beta-methylanthraquinone.

In the practice of the invention the basic catalyst ingredients, i.e., the vanadium oxytrichloride (a) and the alkylaluminum sesquichloride (b), are usually combined in the persence of at least a portion of the monomers, since the best yields are frequently obtained in this way. The activator (c) is not added until after the primary catalysts ingredients (a) and (b) have been combined in the presence of the monomers. In the best practice (from the standpoint of optimum catalyst efficiency), the oxidant (c) is added after the primary catalyst ingredients (a) and (b) have produced a certain amount of polymer and have begun to become exhausted or inactivated, whereupon the added oxidant serves to revitalize the catalyst. However, when it is desired to regulate the molecular weight of the polymer throughout the polymerization reaction, the oxidant (c) may be added at the start. The acid-scavenger (d) is added in the presence of the monomers, after the other catalyst ingredients have been combined.

Continuous or incremental addition of the catalyst ingredients during the polymerization reaction is frequently a desirable mode of operation.

One preferred practice of the invention contemplates continuously performing the steps of (1) interpolymerizing ethylene, propylene and a diene such as dicyclopentadiene, for example, by introducing the mixture of monomers into a first polymerization zone wherein it is combined with at least a portion of each of the primary catalyst ingredients (a) and (b), and (2) withdrawing a stream containing terpolymer from said zone, and (3) repeating steps (1) and (2) in one or more subsequent polymerization zones, into which the reaction stream withdrawn from the previous polymerization zone is introduced successively. There may be introduced incrementally or continuously into each zone more of the primary catalyst ingredients, particularly the vanadium compound, and/or the oxidant (c) and acid-scavenger (d), as required to maintain the system at peak efficiency consistent with economical utilization of catalyst. More of one or more of the monomers may be introduced in such subsequent reaction zones, if desired. The stream issuing from the final reaction zone, in the form of a thick solution or cement, may be processed in the usual ways to separate the polymer and remove catalyst residues.

The process is carried out in a solvent which is not an oxidizing agent and which is inert under the conditions of the reaction. The solvent medium consists essentially of a hydrocarbon solvent, which takes no part in the catalyst-forming reaction or the polymerization reaction, whether it is an aliphatic solvent, as n-hexane, a cycloaliphatic solvent, as cyclohexane, or an aromatic solvent, as benzene.

The procedure may otherwise be the same as in conventional practice as far as such details as temperature of polymerzation, pressure, concentration of catalyst, and the like, are concerned (see, for example, British Pat. 886,368, Jan. 3, 1962 or Belgian Pat. 622,040, Sept. 3, 1962, Uniroyal).

It is important to point out that the use of acid-scavenger (d) with primary catalyst [(a) plus (b)] in the absence of oxidant (c) has little, if any, effect on catalyst efficiency, since the lifetime of the active catalyst species in the absence of oxidant is too short to be appreciably affected by acid residues formed. Any acid residues would be low since no reactivation would have occurred and so the alkylaluminum sesquichloride would still be present as such to a great extent. As one reactivates the basic catalyst again and again, first, by oxidation of the vanadium to a higher valence with the activating chemical 2-nitropropane or beta-methylanthraquinone, and, second, by alkylation with the alkylaluminum sesquichloride, the build-up of acid residues would become appreciable. It is at this point that the acid-scavenger (d) becomes of assistance.

It is also important to note that the purposes of the invention are not served by pre-reacting the activator (c) or acid-scavenger (d) with individual components of the primary catalyst, prior to forming the primary catalyst by interaction of (a) and (b). In this respect the invention is distinct from prior practices such as are represented by U.S. Pat. No. 3,146,224 to Coover, Aug. 25, 1964, wherein a complex is formed beforehand between a prime catalyst component and the additive chemical. Instead, the practice of this invention involves adding the 2-nitropropane or beta-methylanthraquinone (c) and the acid acceptor (d) in measured amounts over a period of time to the polymerization reaction mixture consisting of inert non-oxidizing solvent, polymerizable monomers, and soluble catalyst formed by interaction of (a) and (b).

One method useful for showing the effect of the acid-scavengers (d) on the polymerization is to use "premixed" catalyst [i.e., a mixture of vanadium oxytrichloride (a) and alkylaluminum sesquichloride (b) prepared in the absence of the monomers] and activate this catalyst by adding it to the monomers containing oxidant (c) and acid-scavenger (d). The yield of polymer may then be compared to an otherwise similar blank run where the scavenger (d) has been omitted. This is the procedure used in certain of the following working examples, which will serve to illustrate the practice of the invention in more detail.

EXAMPLES II–XVIII

Using the same procedure as in Example I, the runs shown in Table I, below, are performed.

The solvent is benzene in runs II, III, V, VI and VII; in all other runs the solvent is heptane. All of the runs are binary ethylene-propylene copolymerizations, except runs XVI, XVII and XVIII which are ethylene-propylene-dicyclopentadiene terpolymerizations. The Al:V ratio is 20:1 in all runs except run XI, where it is 15:1. In all runs the amount of vanadium compound is 0.10 millimole. The polymers formed by the method of the invention show no crystallinity, when examined by X-ray. The EPDM's of Examples XVI–XVIII have the following iodine numbers: XVI, 6; XVII, 7.6; XVIII–1, 13; and XVIII–2, 10.

TABLE I

| Example: | Oxidant (c) | Acid-scavenger (d) | Millimoles, (a)/(c)/(d) | E/P | $[n]_{135}$ | Yield, grams | Iodine number |
|---|---|---|---|---|---|---|---|
| II–1 | A | C | 1/1/.5 | 49/51 | 2.08 | 20.2 | |
| 2 | A | | | | | 18.6 | |
| III–1 | B | C | 1/1/.5 | 52/48 | 1.88 | 17.8 | |
| 2 | B | | | 45/55 | 1.68 | 16.0 | |
| IV–1 | B | D | 1/1/1 | | | 14.3 | |
| 2 | B | | | | | 10.4 | |
| V | B | E | 1/1/3 | 65/35 | 1.67 | 19.2 | |
| VI | B | F | 1/1/3 | 62/38 | 1.80 | 17.5 | |
| VII | B | G | 1/1/3 | | 1.77 | 20.6 | |
| VIII | B | H | 1/1/3 | 72/28 | 3.18 | 13.5 | |
| IX | B | I | 1/1/2 | 68/32 | 2.83 | 16.7 | |
| X–1 | B | J | 1/1/3 | 68/32 | 2.78 | 16.5 | |
| 2 | B | | 1/1 | 70/30 | 3.27 | 13.7 | |
| XI | B | C | 1/1/3 | 68/32 | 2.27 | 16.5 | |
| XII | B | C | 1/1/3 | 66/36 | 2.04 | 14.3 | |
| XIII | B | K | 1/1/3 | 70/30 | 3.06 | 14.3 | |
| XIV | B | L | 1/1/3 | 69/71 | 3.37 | 16.8 | |
| XV | B | | 1/1/0 | | | 12.8 | |
| XVI | B | L | 1/3/9 | 67/33 | 1.84 | 19.5 | 6.0 |
| XVII | B | | 1/3/0 | 60/31 | 1.99 | 12.2 | 7.6 |
| XVIII–1 | B | L | 1/1/3 | 73/27 | | 16.5 | 13.0 |
| 2 | B | | 1/1/0 | 73/27 | | 8.5 | 10.0 |

NOTE.—A, beta-Methylanthraquinone; B, 2-Nitropropane; C, Pyridine; D, Diphenylamine; E, N,N-Dimethyl-alpha-naphthylamine; F, n-Octylamine; G, N-Methylaniline; H, Diethyl ether; I, Ethyl acetate; J, Acetone; K, Di-n-butylamine; L, alpha-Naphthylamine.

EXAMPLE I

A dry, 2-liter, 3-necked flask is equipped with stirrer, thermometer, gas inlet tube, addition funnel, and vertical condenser connected to a gas outlet tube. The system is kept free of air or water vapor, prior to polymerization, by an argon sweep. The flask is filled with 700 cc., and the addition funnel with 60 cc., of dry, purified benzene. The solvent in the flask is then saturated with ethylene and propylene at a rate of flow of 2 liters of each minute, kept at this rate throughout the polymerization. To the solvent in the addition funnel is added 0.1 millimole of 2-nitroppane as the oxidant and 0.3 millimole of di-n-butylamine as the acid-scavenger. After ten minutes of gas flow, 100 cc. of premixed catalyst composed of 0.1 millimole of $VOCl_3$ and 1.0 millimole of $Et_3Al_2Cl_3$ are added to the monomer-saturated solvent (20:1 Al:V molar ratio). At this point the dropwise addition of the solution in the dropping funnel is begun and the polymerization begins immediately. The temperature rises to 38° C. from 23° C. and then slowly falls to 35°. After 30 minutes the polymerization is short-stopped with 15 cc. of isopropyl alcohol, and 10 cc. of a 5% solution of "Santowhite" antioxidant [4,4'-thiobis(2-t-butyl-5-methyl-phenyl)] in toluene is added. The polymer is flocculated in acetone-methanol mixture and, after decanting the solvent, the polymer is chopped in methanol, using a Waring Blendor. The yield of polymer is 22 grams. A control run with the same Al-V catalyst and nitropropane, but omitting the amine, gives 16 g. of EPM. Thus, by the method of the invention a 37.5% increase in yield is obtained. The polymer shows no crystallinity, by X-ray. The E/P ratio is 65/35, intrinsic viscosity in Tetralin at 135° is 1.84, 1.92.

EXAMPLE XIX

To show the effect of adding the acid-scavenger to catalyst in the presence of oxidant a 5-gallon pilot plant run is compared with a similar control run in which the acid-scavenger is omitted. The reaction mixtures are formed by adding solvent, saturating it with ethylene and propylene, and adding ethylaluminum sesquichloride. The dicylopentadiene is added. A continuous feed of ethylene and propylene is maintained, the vanadium oxytrichloride is added and dropwise addition of 2-nitropropane or of 2-nitropropane and the amine are begun and continued throughout the reaction. The conditions and results are summarized in Table II.

TABLE II

| | | |
|---|---|---|
| Catalyst | $Et_3Al_2Cl_3$ | $Et_3Al_2Cl_3$ |
| Cocatalyst, mole | $VOCl_3$, .0054 | $VOCl_3$, .0054 |
| Al/V | 20/1 | 20/1 |
| Oxidant, 2-nitropropane, mole | .022 | .0268 |
| Acid-scavenger, alpha-naphthylamine, mole | .048 | None |
| DCPD, grams | 50 | 50 |
| Heptane, kg | 10 | 10 |
| Feed E/P | 4.5/3 | 1/1 |
| Temperature range, ° C | 76–112 | 76–110 |
| Time, hours | 1 | 1 |
| Yield, grams | 782 | 640 |
| Efficiency, grams EPDM/grams $VOCl_3$ | 834 | 680 |
| Weight ratio E/P in EPDM | 54/46 | 58/42 |
| Intrinsic viscosity in tetralin at 135° | 2.56 | 1.91 |
| Iodine number | 6 | 7.6 |

Having thus described our invention, what we claim and desire to protect by Letters Patent is:

1. A composition having improved catalytic activity for the copolymerization of ethylene and an alpha-monoolefin comprising the product formed by admixing
   (a) vanadium oxytrichloride,
   (b) an alkylaluminum sesquichloride,
   (c) 2-nitropropane or beta-methylanthraquinone, and
   (d) an acid-scavenger selected from those organic compounds containing at least one of the hetero atoms N, O, S, Se and Te which are Lewis bases.
the amount of (b) being such as to provide an Al:V ratio of from 5:1 to 20:1, the amount of (c) being at least 0.1 mole per mole of vanadium, the amount of (d) being at least 0.5 mole per mole of (c), and the total of (c) plus (d) being not greater than the molar amount of Al in the amount of (b) taken, the said (a) and (b) being reacted before (c) and (d) are introduced.

2. A composition as in claim 1 in which (d) is selected from di-n-butylamine, pyridine, diphenylamine, N,N-dimethyl-alpha-naphthlyamine, n-octylamine N-methylaniline, diethyl ether, ethyl acetate, acetone, and alpha-naphthylamine.

3. A composition as in claim 2 in which the molar amount of (d) is from 1 to 4 moles per mole of (c).

4. In a method of copolymerizing ethylene and propylene, with or without a copolymerizable non-conjugated diene, wherein the said monomers are contacted in a non-oxidizing inert medium consisting of a hydrocarbon solvent, in the presence of a coordination catalyst formed by interaction of
   (a) vanadium oxytrichloride, and
   (b) an alkylaluminum sesquichloride in amount such as to provide an Al:V ratio of from 5:1 to 20:1,
and the catalyst is activated by addition to the reaction mixture of
   (c) 2-nitropropane or beta-methylanthraquinone in amount of at least 0.1 mole per mole of vanadium,
whereby the catalyst is reactivated as it tends to become spent, the improvement comprising adding
   (d) an acid-scavenger selected from those organic compounds containing at least one of the hetero atoms N, O, S, Se and Te which are Lewis bases, in amount of at least 0.5 mole per mole of (c),
the total of (c) and (d) not exceeding the moles of Al in the amount of (b) taken, whereby the activity and efficiency of the catalyst is further enhanced.

5. A method as in claim 4 in which (d) is selected from
di-n-butylamine
pyridine
diphenylamine
N,N-dimethyl-alpha-naphthylamine
n-octylamine
N-methylaniline
diethyl ether
ethyl acetate
acetone, and
alpha-naphthylamine.

6. A method as in claim 5 in which the molar amount of (d) is from 1 to 4 moles per mole of (c).

7. A method as in claim 5 in which (c) is 2-nitropropane.

8. A method as in claim 5 in which (c) is betamethyl-anthroquinone.

9. A method as in claim 5 in which (c) and (d) are added continually as the polymerization proceeds.

10. A method as in claim 9 in which (a) and (b) are combined in the presence of the monomers prior to addition of (c) and (d).

References Cited

UNITED STATES PATENTS

| | | | |
|---|---|---|---|
| 3,441,546 | 4/1969 | Garner | 260—80.7 |
| 3,462,399 | 8/1969 | Matthews | 260—80.78 |

JOSEPH L. SCHOFER, Primary Examiner

R. S. BENJAMIN, Assistant Examiner

U.S. Cl. X.R.

252—429; 260—88.2